UNITED STATES PATENT OFFICE.

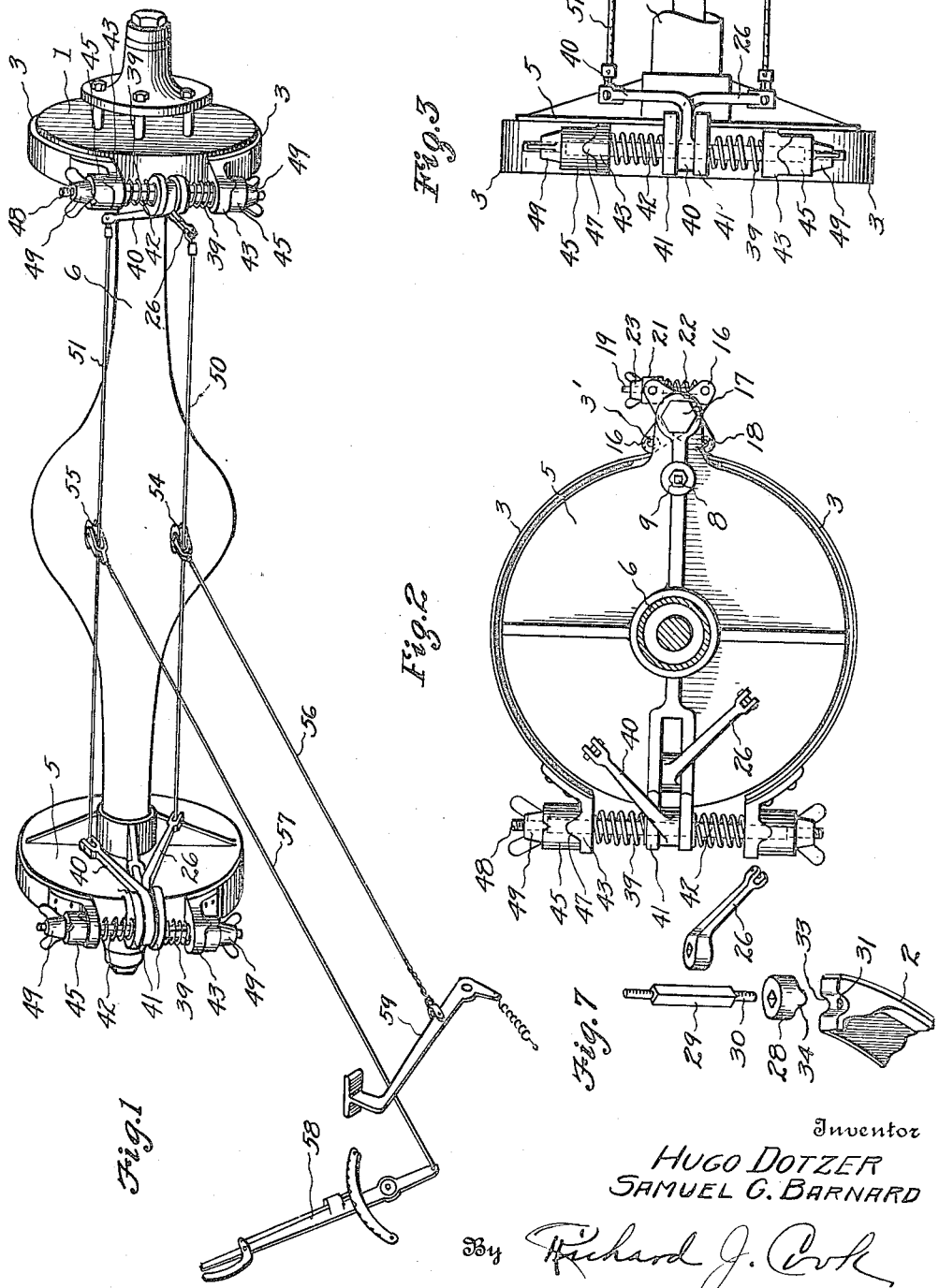

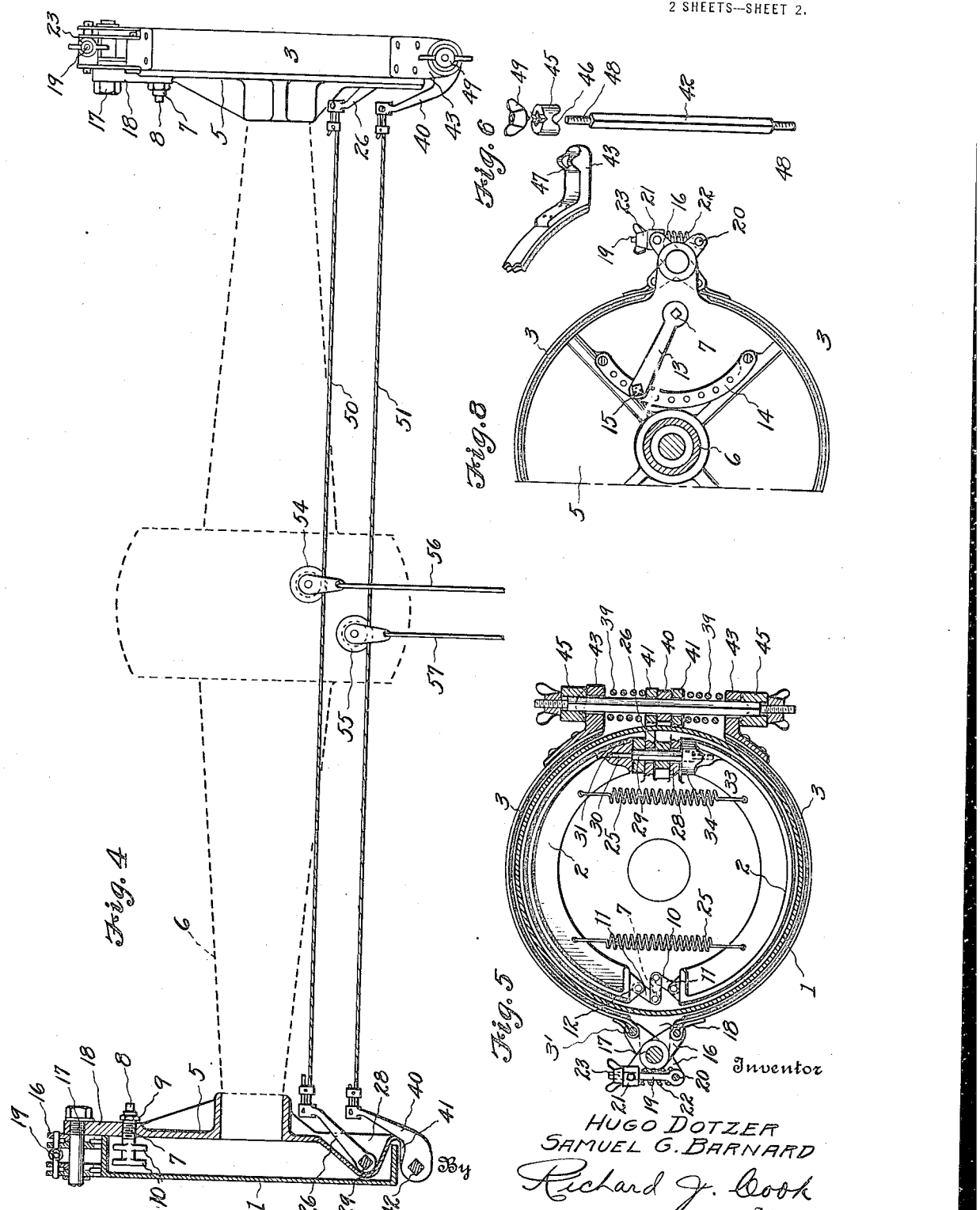

HUGO DOTZER AND SAMUEL G. BARNARD, OF SEATTLE, WASHINGTON; SAID BARNARD ASSIGNOR TO SAID DOTZER.

BRAKE MECHANISM.

1,422,423.　　　　　Specification of Letters Patent.　　Patented July 11, 1922.

Application filed March 9, 1920. Serial No. 364,438.

*To all whom it may concern:*

Be it known that we, HUGO DOTZER and SAMUEL G. BARNARD, citizens of Germany and the United States, respectively, and residents of the city of Seattle, county of King, and State of Washington, have invented certain new and useful Improvements in Brake Mechanism, of which the following is a specification.

This invention relates to improvements in brakes, and more particularly to brakes and brake control mechanism of that character most commonly used in connection with automobiles, trucks, trailers, or like vehicles, wherein the braking mechanism comprises the common and well known drums, secured at the opposite ends of the vehicle axles, and which are equipped with expandable interior and contractable exterior brake bands, or shoes, controlled through the medium of connecting members operated either by the use of foot pedals, or locking levers, located conveniently accessible to the driver of the vehicle.

Most braking systems of this character now in use, while in most respects efficient, are deficient in the respect of equalizing the braking forces as applied to the opposite sides of vehicles and in maintaining a constant adjustment of the brakes regardless of the spring deflection of the vehicle. An equal application of braking force to the opposite sides or drums of a car is very important to the holding of a car to its course, and any unequal application of power will cause, or tend to cause, swerving or skidding of the car to a more or less degree depending on the variation in the adjustment of the brakes.

Another objection in brakes as now constructed is that, brakes when properly adjusted for a vehicle carrying a light load are thrown out of adjustment when a heavy load is placed on the vehicle; the change of adjustment being caused by the greater deflection of the vehicle springs which changes the relative positions of parts attached to the brake bands and to the vehicle frame which is supported by the springs.

It is, therefore, the principal object of the present invention to eliminate the cause for skidding by the provision of a braking system, applicable to either the front or back wheels of automobiles, trucks, trailers, or like vehicles, wherein the braking forces, as applied to the opposite side or wheels of a vehicle, are self equalizing, that is, a system in which, regardless of any unequal wear, the area of friction surface or adjusted pressure of the brake band sections, the braking forces when applied are automatically equalized under any and all ordinary conditions, and the setting of the brakes with respect to the drums remains constant regardless of the variation in the deflection of the springs on which the vehicle ' supported.

It is also an object of the invention to so construct the brake mechanism that the external brakes may be removed without removing the vehicle wheels, and to provide an external adjustment for the internal brake sections.

In accomplishing these and other objects of the invention, we have provided the improved details of construction, the preferred forms of which are illustrated in the accompanying drawings, wherein—

Figure 1 is a perspective view of the rear axle of a motor vehicle equipped with braking mechanism embodying the present invention.

Figure 2 is an inside face view of one of the brake assemblies, showing the position of the brake levers.

Figure 3 is an edge view of the same.

Figure 4 is a plan view of the axle and brake drums, and the brake controlling cables; one of the drums being shown in section for better illustration.

Figure 5 is a sectional view of a brake assembly taken in a plane perpendicular to its axial line.

Figure 6 is a detail perspective view of a set of exterior brake actuating parts, shown disassembled.

Figure 7 is a similar view of a set of interior brake actuating parts.

Figure 8 is a face view of a brake assembly illustrating an alternative construction for adjusting the interior brake shoes.

Referring more in detail to the drawings: The present brake mechanism employs the usual drums 1 which are secured to the interior faces of the wheels at opposite sides of a vehicle and which are adapted to be engaged internally by paired, semi-circular brake shoes 2, and externally by semi-circular bands 3, all of which are equipped with frictional bands of asbestos brake lining, leather or fabric, suitably riveted thereto, and are mounted in operative, functional position upon drum covers or plates, 5, secured to the opposite ends of a non-rotatable axle housing 6.

The two internal brake shoes 2, as here shown, are mounted at their rearward, adjacent ends in such a manner that they may be adjusted to the drum by an adjusting bolt that extends externally of the drum. This eliminates removing of the wheels to effect this adjustment and consequently makes adjustment quicker and easier than is possible in the usual construction.

This means for mounting and effecting adjustment of the internal brakes is best shown in Figures 4 and 5, and in each brake assembly consists of a bolt 7 that is threaded through the drum cover or plate, 5. At their outer ends, these bolts are squared, as shown at 8, so that a wrench may be applied thereto to turn the bolts and effect adjustment when the parts are assembled on the wheel in running position and are equipped with lock nuts 9, that may be tightened against the mounting plates to hold the bolts against turning after they have been adjusted.

At their ends within the drums, the bolts 7 are each equipped with two pairs of oppositely extending arms 10, and pivotally mounted between the ends of each set of arms are the inner ends of toggle links 11, which at their outer ends, are pivotally fixed between ears 12 extending from the adjacent ends of the cooperating brake shoes.

With this manner of connection, it is apparent that by applying a wrench to the squared ends 8 of the bolts 7, the latter may be turned to adjust the shoes toward or from the drum flanges, and that, when a desired adjustment has been made, the bolts may be locked by tightening the nuts 9 against the faces of the drum plates to maintain this adjustment.

As an alternative means of effecting this same adjustment, we may equip the squared ends of the bolts 7 with levers 13 which are movable at their outer ends adjacent arcuate plates 14, secured, as is shown in Figure 8, to the inner faces of the drum plates 5. These levers are provided with threaded openings adapted to be moved into registration with similar spaced apertures in the plates 14, so that after the levers have been swung to effect proper setting, or adjustment, of the shoes 2, a bolt or screw, as shown at 15, may be threaded through the lever aperture and a registering plate aperture, to hold the parts as adjusted.

The external brake band sections 3 of each drum are connected, at their rearward, adjacent ends, through the medium of two pairs of short levers 16 which are centrally pivoted on a bolt 17 that is mounted in a projecting portion 18 of the drum cover 5 In this connection the inner ends of the two pairs of levers are pivotally connected to the ends of the two band sections 3 by removable pins 3', and their outer ends are connected by a bolt 19, that is secured at its lower end to a pin 20 extended between the ends of one set of levers and is slidable through a block 21 to which the ends of the opposite set of levers is secured. A spring 22 is mounted on the bolt between the pin 20 and block 21 to urge them apart and a wing-nut 23 is threaded onto the outer end of the bolt to limit the spreading movement of the links.

Normally, the internal brake shoes of each brake assembly are retained disengaged from their drum flange by a pair of coiled springs 25, best shown in Figure 5, which have their opposite ends secured to the opposite shoes in a manner that will draw the shoes toward each other. The means for expanding these internal shoes to effect braking contact with the drum flange consists in each assembly of a lever 26, that is mounted within and extends outwardly from a pocket 28 formed in the drum cover 5; the lever being mounted on a cam shaft 29 that extends vertically through the pocket and which is squared except at its ends which terminate in short rounded lengths 30 extended revolubly within sockets 31 in the forward adjacent ends of the drum shoes.

The two ends of these shoes are provided with cam sockets 33, adapted to receive cam heads 34 which are locked against rotation on the shafts 29 to be revolved therewith when the pins are revolved by actuation of the levers 26. The relative setting of the levers 26 and heads 34 on the shafts 29 is such that when the levers 26 are in their rearward position, as shown in Figure 4, the cam sockets will receive the cam heads and thus permit the brake shoes to contract within the drum, while, if the levers are swung forwardly, the cam heads will spread the shoes to braking contact with the drums.

In each assembly the levers 26, and heads 34 are equipped with squared openings for receiving the shaft 29 and need no other locking to the shaft, as it is impossible, after the parts have once been assembled, to disassemble them except by removing the vehicle wheel.

The external brake sections 3 are contracted to braking engagement by means of levers 40 that are pivotally mounted between spaced wings 41, extending forwardly from the plates 5. These levers are fixed on cam shafts 42, extended vertically and revolubly through the said flanges and also through shoes 43 fixed to the forward adjacent ends of the brake bands, as is shown in Figures 2 and 3.

Mounted on the ends of the shafts 42 to turn therewith are cam heads 45 provided with cam sockets 46 adapted to co-act with cam faces 47 on the shoes 43 so that turning of the shaft by means of the lever will cause the bands to be tightened against the brake drums.

In this construction the levers and cam heads are similar to those of the internal brake mechanism, and the openings through the brake shoes are circular to permit the squared shafts to turn therein. The ends of the shafts 42 terminate in small threaded ends 48 whereon thumb nuts 49 are mounted to engage the heads 45 to hold the parts in functional relation, and coiled springs 39 are mounted about the pins between the levers 40 and shoes 43 to urge the brake bands normally from braking contact with the drums.

The means for actuating and through which an equalized braking force is automatically placed on the two sides of the vehicle, consists of cables 50 and 51, which respectively connect the inner ends of the internal brake levers 26 and external brake levers 40. Adapted to roll along these cables are pulley wheels 54 and 55, which are mounted in blocks to which cables 56 and 57 are attached. These latter cables are extended forwardly to control mechanism indicated by the lever 58 and foot pedal 59.

With the brake assemblies so constructed and connected by the transverse cables, it is apparent that tension on the cables which connect with the control pedals or levers will be transmitted to the transverse cables and thence to the brake levers. It is also apparent, that, should it require one brake lever to move in a greater arc before its brake parts became effective than is required by the opposite lever of that pair, the pulley will automatically shift itself toward the lever which moves in the greater arc and will, in this way, equalize the tension on the two levers and their brake bands or shoes.

It is also apparent that in the construction described, no parts of the brake mechanism are attached to the vehicle frame but all are mounted on the drum cover and have no movement relative to the wheel, and a constant relation is maintained regardless of the load that may be placed on the vehicle body.

It is also seen that external adjustment is provided for the internal brakes which permits adjustment without removal of the vehicle wheels.

As a summary it is stated that the present construction is applicable to either the front or rear wheels of motor vehicles, trailers, etc., is automatically adjustable to effect equal braking forces on both sides of a vehicle, thereby preventing skidding, provides for equal wear on tires, makes locking of wheels less apt to occur, affords external adjustment of internal brakes and permits demounting of the external bands without removing the vehicle wheels.

What we claim as new, is:

1. In a vehicle of the character described, the combination with wheels at opposite sides of the vehicle having braking mechanism and arms movable to actuate the braking mechanism, of a cable connected at its ends to the ends of said arms and drawn taut between them, a brake lever and a connecting means fixed at one end to the brake lever, and at its opposite end having a movable connection with the first named cable whereby tension by actuation of the brake lever causes actuation of the brake arms and automatic adjustment of the connection along the arm connecting cable whereby equalization of tension on both braking mechanisms is effected.

2. In a vehicle of the class described, the combination with wheels at opposite sides of the vehicle having braking mechanisms and arms movable to actuate the braking mechanism, of a cable connected at its end to said arms and drawn taut between them, a brake lever, and a cable of considerable length connected to said lever at one end, and at its opposite end having a pulley connection with the arm connecting cable whereby actuation of the brake lever places tension on the latter cable which causes actuation of the brake arms and an automatic adjustment of the pulley along the arm connecting cable to effect an equal pressure on both brake mechanisms.

Signed at Seattle, Washington, this 1st day of March, 1920.

HUGO DOTZER.
SAMUEL G. BARNARD.